March 9, 1926.  
E. O. YOUNG  
1,576,491  
SELF CLEANING PATCH APPLYING INSTRUMENT  
Filed Nov. 18, 1925
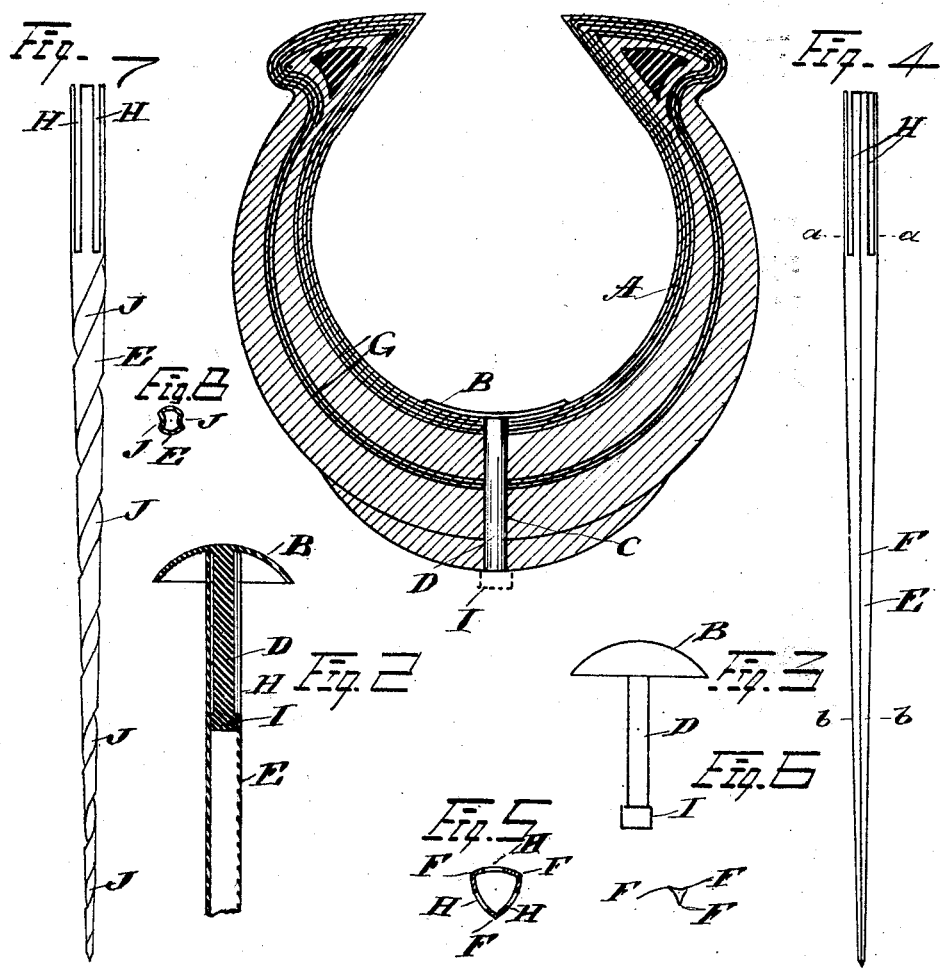
Inventor  
Edward O. Young  
by *signature*  
Attorney Patented Mar. 9, 1926.

1,576,491

UNITED STATES PATENT OFFICE.

EDWARD O. YOUNG, OF CLEVELAND HEIGHTS, OHIO.

SELF-CLEANING PATCH-APPLYING INSTRUMENT.

Application filed November 18, 1925. Serial No. 69,819.

*To all whom it may concern:*

Be it known that I, EDWARD O. YOUNG, a citizen of the United States, and resident of Cleveland Heights, in the county of Cuyahoga and State of Ohio, have invented certain new and useful Improvements in Self-Cleaning Patch-Applying Instruments, of which I hereby declare the following to be a full, clear, and exact description, such as will enable others skilled in the art to which it appertains to make and use the same.

The objects of this invention are to provide a simple and efficient instrument for applying a sheet rubber patch closely to the surface of a tire to cover a puncture therein.

The device is adapted to be employed in connection with a tire patch provided with a central stem and particularly with the type of vacuum patch described in the copending application Ser. No. 68187 filed Nov. 10, 1925, in which a cup shaped patch is described, which is filled with rubber cement or putty.

In the present device a tapered tubular holder for the stem of the patch is provided, which is slotted at the larger end to form spring arms or fingers to grasp the stem.

Also the sides of the pointed instrument are made angular or grooved in section, thus providing cutting edges that facilitate the insertion of the instrument into the tire.

A distinct improvement also in the use of the instrument and of tire patch, is found in the addition of an enlargement upon the outer end of the stem, which prevents the cement from entering the tube and makes it self-cleansing, thus avoiding an otherwise unsurmountable difficulty in the use of the instrument.

To permit of this use the slots in the end of the tube should not be deeper than the length of the stem, plus the aforesaid enlargement, the enlargement thus preventing the passage of cement into the tube, and serving to wipe the arms clean whenever the instrument is withdrawn.

The device is illustrated in the accompanying drawings, hereinafter described, and specifically pointed out in the claims.

In the accompanying drawings, Fig. 1 is a transverse section of a tire casing showing the use of the patch, Fig. 2 is a vertical section of the instrument showing a patch in place therein; Fig. 3 is a side elevation of the tire patch, Fig. 4 is a side elevation of the preferred form of the instrument; Fig. 5 is a transverse section thereof on line *a—a* Fig. 4; Fig. 6 is a similar section on line *b—b* Fig. 4; and Fig. 7 is a side elevation of a modified form of instrument; and Fig. 8 is a transverse section thereof.

In these views A represents a tire casing and B is a sheet rubber patch applied to a puncture C therein; D is the stem of the patch, which has been drawn through the puncture C, and the protruding end cut off.

In Fig. 4 a long tapered tube E is shown which is triangular in section, thus presenting cutting edges F. F. which penetrate easily through the canvas layers G. G. of the casing in the manner of a needle.

The larger extremity of the instrument is longitudinally slotted at H. H. this providing fingers with which the stem of the patch may be grasped to pull it through the puncture.

The patch is crowned to form a cup which is filled with cement, and, after the insertion of the stem the cement is pressed into the puncture by flattening down the concaved patch as shown in Fig. 1, and to prevent the cement from entering the tube of the instrument, the stem is provided with a head or enlargement I, which fills the tube at that point.

This enlargement is also useful when drawing off the tube, in wiping from the fingers the cement remaining thereon, thus keeping the tube clean for future use.

After the patch has been put in place the protruding head or enlargement I may be cut off close to the outer face of the tire, as shown in dotted lines in Fig. 1.

In Fig. 7 the tapered sides of the instrument below the slots therein are shown spirally grooved at J. J. to provide cutting edges that will automatically penetrate the casing in the manner of a drill when the instrument is revolved.

Having described the invention, what I claim as new and desire to secure by Letters Patent is:

1. In an instrument for applying a tire patch, said patch having a central stem extending from one side thereof, the said stem having a terminal enlargement, said instrument having an elongated tapering body open at one end to receive said enlargement and stem, the large extremity of said body being longitudinally slotted as far as the position of said enlargement therein, to form grasping fingers, said enlargement serving as a stopper to prevent the passage of cement into said body, said enlargement serving also as a wiper for cleaning said fingers when said body is withdrawn therefrom.

2. In a device of the character described, the combination with a tire patch said patch having a stem, said stem being provided with an enlargement at one end, of a grasping instrument therefor, having an elongated tapered body and having spaced longitudinal fingers projecting at one end adapted to engage with the sides of said enlargement, the enlargement at the end of said stem serving to prevent the entrance of cement into said body.

3. In a device of the character described, the combination with a tire patch said patch having a stem, and said stem being provided with an enlargement at one end, of a grasping instrument therefor, having an elongated tapered body and having spaced longitudinal fingers projecting at one end adapted to engage with the sides of said enlargement, the enlargement at the one end of said stem serving to prevent the entrance of cement into said body, the sides of said body being provided with longitudinal cutting edges.

4. An instrument for the purpose described consisting in, an elongated tapering body having spaced longitudinal cutting edges, and provided with spaced projecting fingers at its larger end, substantially as described.

5. The combination with a crowned tire patch forming a cup for receiving cement, and having a central stem provided with an enlargement at one end, of a hollow tapered holding instrument therefor having a longitudinal central opening into which said enlarged extremity of said stem is fitted, one end of said instrument being longitudinally slotted to provide fingers for grasping said enlargement, said enlargement providing means preventing the passage of cement into the body of said instrument.

In testimony whereof, I hereunto set my hand this 16th day of November 1925.

EDWARD O. YOUNG.